United States Patent

[11] 3,611,344

| [72] | Inventor | John R. Couper |
| | | 406 W. 12th St., Loveland, Colo. 80537 |
| [21] | Appl. No. | 848,166 |
| [22] | Filed | Aug. 7, 1969 |
| [45] | Patented | Oct. 5, 1971 |

[54] REACTION ACTUATOR FOR VEHICLE OPERATORS
10 Claims, 4 Drawing Figs.

[52] U.S. Cl. .................................................... 340/279,
180/97, 340/52 R, 340/263
[51] Int. Cl. ........................................................ G08b 21/00
[50] Field of Search ............................................ 340/279,
309.1, 223, 52 R; 180/99, 82, 97

[56] References Cited
UNITED STATES PATENTS

| 2,625,594 | 1/1953 | Mathis.......................... | 340/279 |
| 3,106,981 | 10/1963 | Chakiris........................ | 340/279 |
| 3,186,508 | 6/1965 | Lamont.......................... | 340/279 |
| 3,312,508 | 4/1967 | Keller et al. .................. | 340/279 |

*Primary Examiner*—John W. Caldwell
*Assistant Examiner*—J. Michael Bobbitt
*Attorney*—Richard D. Law ABSTRACT: A system for initiating conscious activity of a vehicle operator utilizes a visual alarm signal which is automatically and periodically actuated and which signal must be promptly manually deactivated by the operator to prevent actuation of an audio alarm signal which in turn must be promptly manually deactivated by the operator to prevent simultaneous actuation of external emergency flashing lights, an automobile horn and an engine deactivator which temporarily deactivate the vehicle engine for stopping the engine.

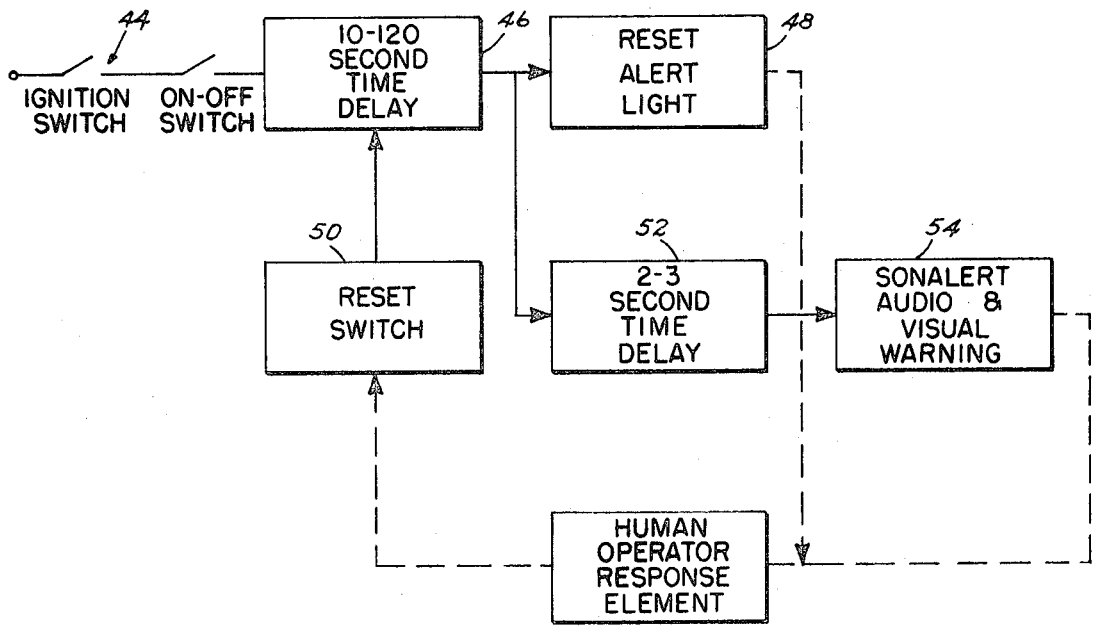
FIG. 2
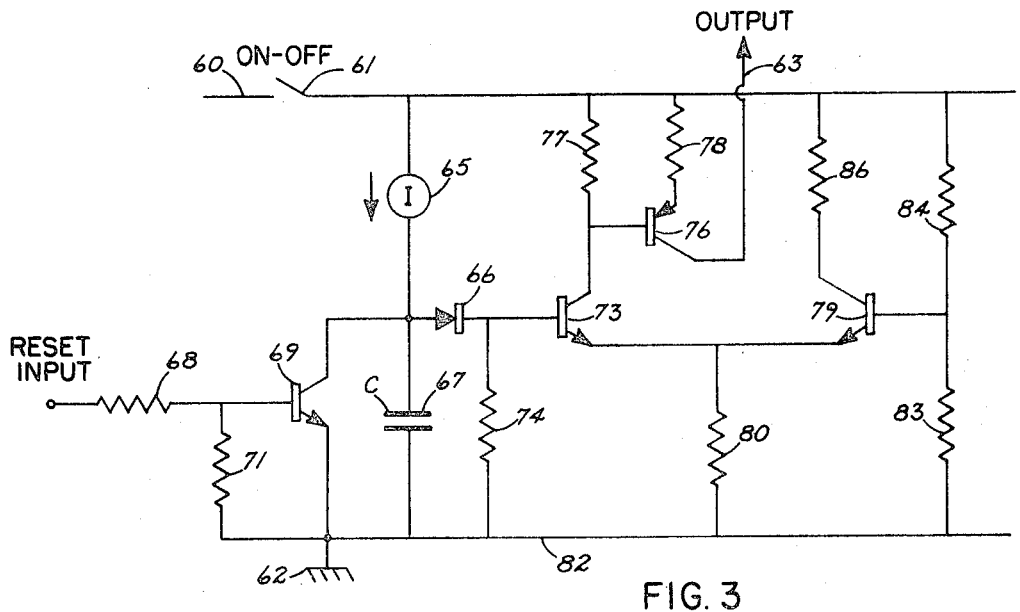
FIG. 3
| I | Time Delay | C |
|---|---|---|
| 1μa | .5 Sec. | 0.1 μfd |
| 0.5 | 1.0 Sec. | 0.1 μfd |
| 0.25 | 2.0 Sec. | 0.1 μfd |
| 0.20 | 2.5 Sec. | 0.1 μfd |
| 0.10 | 5.0 Sec. | 0.1 μfd |
| 0.16 | 30.0 Sec. | 0.1 μfd |
FIG. 4
INVENTOR
JOHN R. COUPER
BY
Richard H. Law
ATTORNEY 3,611,344

REACTION ACTUATOR FOR VEHICLE OPERATORS

Statistics show that over 70 percent of all serious accidents on our nation's highways are one car accidents, and a great majority of these are caused by inattention of the driver caused by drowsiness, weariness, and actually falling asleep. These conditions impair the reaction time of the driver. In addition to the weariness and sleepiness of a driver, intoxication impairs the driver's ability to react accurately to the various situations which occur during driving. Sudden illnesses such as onslaught of a stroke, heart attacks and the like incapacitate the driver and usually before the driver can bring the vehicle to a complete stop.

According to the present invention there is provided a system protecting the operators and the vehicles from physical impairment. The system is arranged to periodically test the operator's alertness, reaction time and ability to act, permitting all normal maneuvers when the operator properly reacts, but stops the vehicle when the operator does not properly react The system includes a first periodic visual signal which requires a physical act to deactivate the signal each time the signal is activated. In the event the visual signal is not deactivated in a very short time an audio alarm is activated which requires the operator to physically react to deactivate the alarm and in the event the system is not deactivated emergency flashes are actuated and the engine of the vehicle is temporarily deactivated to prevent further operation of the vehicle.

Included among the objects and advantages of the present invention is a system for maintaining an automobile operator alert for operation thereof.

Another object of the invention is to provide a system of progressive warning signals for the purpose of maintaining a vehicle operator alert but which system is intended to be deactivated by physical movement of the operator on activation of each signal.

A further object of the invention is to provide a warning system for the operator of a motor vehicle which provides external warning for other vehicles and which stops the operation of the vehicle in the event the warning system is not deactivated.

A further object of the invention is to provide a system for automatically stopping a vehicle in the event the operator of the vehicle is unable to activate a warning system.

These and other objects and advantages of the invention may be readily ascertained by referring to the following description and appended illustrations in which:

FIG. 2 is a modified block diagram circuit for a warning system according to the invention;

FIG. 3 is a circuit diagram of one form of timing circuit of a warning system according to the invention; and FIG. 4 is a table showing the time delay changes which may be used in the circuit of FIG. 3 for a system according to the invention.

Figure 1:
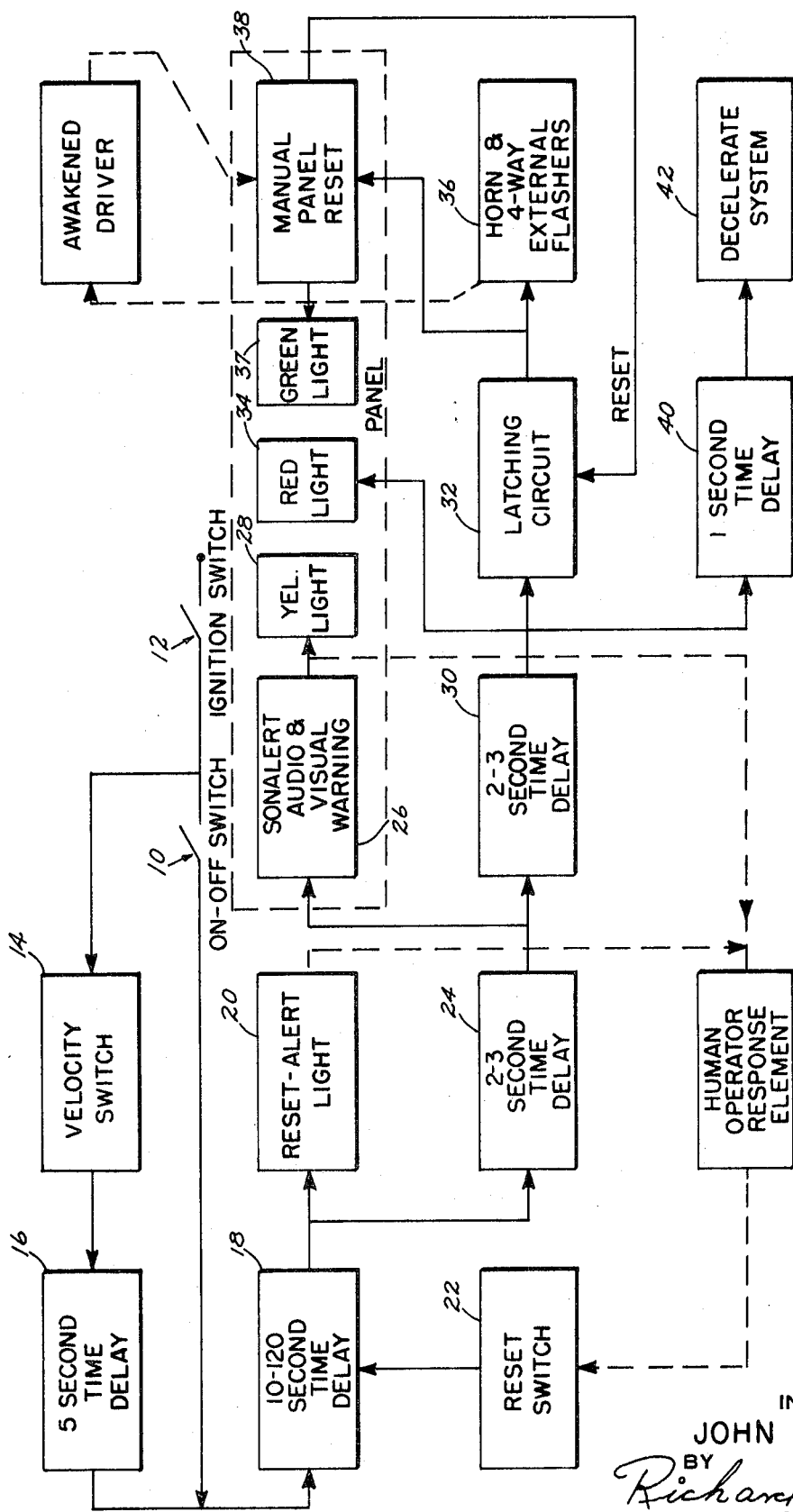
FIG. 1 is a schematic block diagram circuit for one form of system according to the invention.

In general, the system according to the invention provides a small blue light placed substantially directly in the road line of vision of the operator on or above the instrument panel. This blue light is periodically illuminated in a regular sequence of timing, for example, every 4 minutes, while the vehicle is in motion and preferably above a predetermined speed. A floor switch is provided in the driver's compartment of the vehicle, and the operator has a predetermined period of time to press this switch to deactivate this system when the blue light is illuminated, for example a 3 second time interval to react. If the operator presses the deactivate button, the system is deactivated and the timing sequence recommences until the light is again illuminated in its regular cycle. However, if the operator does not deactivate the system by the foot switch, an alarm system (an audio tone and sometimes a yellow light) on the instrument panel will be activated at the end of the three second period. The operator then has a predetermined time to deactivate the alarm system by depressing the foot switch, and if the foot switch is not depressed a third alarm system is activated, including exterior emergency flashers and a loud audio horn are activated. Simultaneously the automobile engine is deactivated, either by breaking the ignition system or by a temporary disconnect of the accelerator to the engine. At any time during the activation of the first two warning systems, the foot switch may be depressed to deactivate the system and reset the timing sequence. With the third, a manual switch on the instrument panel is moved to reactivate the automobile engine and turn off the external flashers.

The block diagram of FIG. 1 shows a general configuration of a system according to he invention. For effectiveness, a warning system on and off switch 10 is connected to the ignition switch 12 so that the warning signal switch is turned on at the same time the ignition switch is turned on. This insures that the warning system is in effect at all times that the ignition switch is on. A further refinement may be to provide an override switch which will only permit the system to be activated above a particular speed, for example 40 miles per hour, whereby the operator in an urban area need not be bothered with the system since this is usually at slow speeds with traffic sufficient to keep the driver alert. In this case a velocity switch 14 is introduced into the system and the system cannot be activated until the vehicle reaches the predetermined velocity. A 5 second time delay unit 16 prevents immediate energizing of the system on the activation of the velocity switch. A time delay unit 18 in the system provides a predetermined time delay in which an alert light is activated. A time delay of 10 to 120 seconds is indicated, however this may be a time delay unit providing any reasonable sequence which will test a driver's alertness, for example 2 to 5 minutes for open road driving may be satisfactory. The time delay may, also, be made to reduce the time interval as the vehicle speed is increased. The time delay unit 18 activates an alert light 20 at the end of the time delay, and a reset switch 22 (activated by the human operator of the vehicle on observing the alert light) deactivates the alert light and then resets time delay, starting the sequence of timing again. In the event the operator does not press the reset switch, a 2 to 3 second time delay unit 24 activates a visual and audio alert system 26 and starts time delay system 30. Again the human operator on hearing or seeing the second warning system may reset the switch 22 deactivating the alert light, the audio visual warning, the time delay system 30 and starting the timing circuit 18 into another sequence. The audiovisual-warning circuit turns on a yellow light 28 (usually mounted on the instrument panel) and this remains on unless the operator resets the time delay circuits by reset switch 22. If the operator does not press the reset switch circuit 30 activates a latching circuit 32 and simultaneously a red light 34 and a 1 second time delay 40. The latching circuit activates a loud audio signal or horn (if desired) and external flashers in circuit 36. The driver has then 1 second to push a manual reset switch 38, and in the event that the driver does not, the 1 second time delay 40 activates a deceleration system 42, which may be any system which will deactivate the vehicle engine and actually stop the vehicle. Some of the deceleration systems would include those which disrupt the electrical system to the engine, for example a solenoid switch on the line from the coil to the distributor to disrupt the ignition system, a solenoid temporarily disconnecting the accelerator system, a combined system which disconnects the accelerator and automatically applies braking pressure to the braking system, etc. The stopping of the vehicle is of value if the driver has lost ability to drive for any reason, and the flashing emergency lights alerts other drivers of an emergency.

A simplified circuit for only testing driver response is shown in the block diagram of FIG. 2, wherein a combined off and on switch and ignition switch 44 activates a time delay unit 46 which activates and illuminates an alert light 48 and activates a second time delay unit 52. If the human operator does not, within 2 to 3 seconds, deactivate the system by means of reset switch 50, the time delay unit 52 (which may be of the 2 to 3 second variety) activates an audio and visual warning circuit 54, which may be deactivated by means of the human operator actuating the reset switch 50. In this simplified circuit there is no attempt to deactivate the vehicle itself, but it merely provides a means for keeping the operator alert and requires the operator to depress the reset switch in a predetermined period of time or the second warning systems will be alerted. The audio and visual warning system may be made loud enough so that it is clearly heard even over the noises of a high-speed vehicle, and the visual system may be sufficient to alert a reasonably normal driver.

One form of timing circuit is shown in FIG. 12, where a hot line 60 is provided with an on and off switch 61, for example, similar to the one earlier described as connected with the ignition switch, to provide current to the circuit which is grounded at 62. The output 63 of the timing circuit actuates a warning light circuit and a second timing circuit, for example the alert light 20 of FIG. 1 leading to the audiovisual-warning circuit 26 and the timing circuit 24. A solid-state second timer 65 (any conventional timer) is connected across a diode 66, a semicontrolled rectifier (SCR) 73 and a resistance 77. The reset input passes through a resistor 68 to an SCR 69 and across resistor 71 to the ground 62. A lead from diode 66 goes to the base of the SCR 73 and the lead from the diode to the triode intercepts a lead from resistor 74. The input of the SCR 73 is also the base lead to SCR 76 both connected to resistor 77. The input for SCR 76 is from resistor 78. The output of triode 73 and the output of triode 79 join through resistor 80 onto the line 82. Resistor 83 and resistor 84 join to the base lead of SCR 79 and a resistor 86 is in the input line to the SCR 79. With a 12 volt circuit, the resistor 78 is a 1K resistance and the resistor 71 is a 10K resistance. The capacitor is a $0.1\mu FD$ and the two SCR's 73 and 78 are 2N5123's. The resistance 74 is a $20\mu$ and the resistors 80 and 83 are 5k resistances. Input resistor 86 is a 1k resistor, and the resistor 84 on the input to the base of SCR 79 is a 7k. The SCR 76 is a 2N4118 and resistor 78 is a $5\mu$ resistance. With this circuit the timing unit 65 may be changed as shown in the chart of FIG. 4, thus by changing the unit I to that shown in the chart various time delays for the output may be achieved.

The major purpose of the invention is to achieve a physical movement of the operator to insure that the operator is awake and alert. The foot switch for the reset may be placed in a position where it is generally out of the way but it is fairly readily reached by the left foot of the operator. The blue light, in the vision of the operator, may be provided with a variable intensity, bright for daytime and dimmer for night driving. The intensity of the blue light may be controlled by means of a photoresistive cell so that it is automatically brightened or dimmed as the conditions change. The time units may be thermal time delay units and the change in time is achieved by changing the heater element. For example, 12N03T thermal time delay unit may be used in the system shown in FIG. 3. Thermal time delay units and solid-state timers are conventional, and the circuit of the invention is simple and readily adapted to any conventional timer device. In place of a foot reset switch, a magnetic reed proximity switch on the steering wheel or the steering column may be utilized where the movement of a few degrees in either direction resets the main sequence timer. A manual hand switch on the steering wheel may also be used.

In the case of the circuit of FIG. 1, the operator is required to depress the reset switch each time the alert light is illuminated, and in the event the reset switch is not set the audiovisual warning is activated, which after 2 to 3 second delay activates the latching circuit and the external emergency system. This requires the use of a manual reset so that a driver who lets the warning system operate long enough for the horn and the external flashers to illuminate, must actuate the manual reset as well as the foot reset, which almost insures that the driver is alert and awake. With this system, the decelerate system cannot be reactivated without the driver resetting the manual reset and the foot reset. One advantage of the accelerator disconnect system, it may be made in such a manner that the accelerator cannot be reactivated until it is fully released by the operator's foot and after the manual reset and the foot reset switches have been deactivated the acceleration system may then be reactivated. This requires another manual operation further helping to keep the driver alert.

While the invention has been illustrated by reference to particular devices, there is no intent to limit the spirit or scope of the invention to the precise details so set forth except as defined in the present claims.

I claim:

1. A system for periodically testing the alertness of a vehicle operator comprising
   a. first timer means;
   b. first alarm means periodically and automatically actuated by said first timer means;
   c. means inclusive of a manually actuated switch for deactivating said first alarm means and restarting the timing sequence of said first timer means;
   d. second timer means actuated by said first timer means on actuation of said first alarm means and deactivated by said means inclusive of said manually actuated switch; and
   e. second alarm means inclusive of an audio signal activated by said second timer means in the event said second timer means is not deactivated by said means inclusive of said manually actuated switch.

2. A system for periodically testing the alertness of a vehicle operator according to claim 1 wherein said first timer means actuates said first alarm means in a range of from 10 seconds to 5 minutes.

3. A system for periodically testing the alertness of a vehicle operator according to claim 1 wherein said first alarm means includes a light in the road line of vision of the vehicle operator.

4. A system for periodically testing the alertness of a vehicle operator according to claim 1 wherein said second alarm means includes an audio alarm.

5. A system for periodically testing the alertness of a vehicle operator according to claim 4 wherein said second alarm means includes an instrument panel mounted light and said audio alarm.

6. A system for periodically testing the alertness of a vehicle operator according to claim 3 wherein said light is a blue light.

7. A system for periodically testing the alertness of a vehicle operator comprising
   a. first timer means;
   b. first visual signal means periodically and automatically actuated by said first timer means;
   c. means inclusive of a first manually actuated switch for deactivating said first visual signal means;
   d. second time delay means actuated on actuating said first visual signal means by said first timer means;
   e. second circuit means actuated by said second time delay means and arranged to be deactivated by said first manually actuated switch;
   f. second signal means connected to said second circuit means including an audio signal actuated by said second time delay means;
   g. third time delay means actuated on activation of said second signal means and deactivated by said first manually actuated switch;
   h. third circuit means actuated by said third time delay means;
   i. third signal means actuated by said third circuit, including external emergency lights on said vehicle and means for deactivating the engine of said vehicle;
   j. and means inclusive of second manual switch means for deactivating said third circuit thereby deactivating said emergency lights and reactivating the engine of said vehicle.

8. A system for periodically testing the alertness of a vehicle operator according to claim 7 wherein said first timer means provides a relatively long time interval for the periodical activation of said first signal means, and second and third time delay means provide a relatively short time interval.

9. A system for periodically testing the alertness of a vehicle operator according to claim 7 wherein said third circuit means includes a red light signal means.

10. A system for periodically testing the alertness of a vehicle operator according to claim 8 wherein said second and third time delay means provide a time interval of from 2 to 3 seconds.